United States Patent [19]

Terashima et al.

[11] Patent Number: 5,649,632
[45] Date of Patent: Jul. 22, 1997

[54] FIXTURE ASSEMBLY FOR PIPE MATERIALS

[75] Inventors: Kaihei Terashima; Hiroshi Okuno, both of Kobe; Haruho Niwa, Handa, all of Japan

[73] Assignees: Kawasaki Steel Corporation; Shinwa Package Kabushiki Kaisha, both of Hyogo, Japan

[21] Appl. No.: 604,998

[22] PCT Filed: Jun. 29, 1995

[86] PCT No.: PCT/JP95/01317

§ 371 Date: Apr. 3, 1996

§ 102(e) Date: Apr. 3, 1996

[87] PCT Pub. No.: WO96/01217

PCT Pub. Date: Jan. 18, 1996

[30] Foreign Application Priority Data

Jul. 4, 1994 [JP] Japan ................................ 6-151850

[51] Int. Cl.$^6$ ...................................................... A47F 1/04
[52] U.S. Cl. ........................ 211/59.4; 211/60.1; 248/68.1
[58] Field of Search ............................... 211/59.4, 60.1, 211/70.4; 248/68.1; 206/443

[56] References Cited

U.S. PATENT DOCUMENTS

| | | | |
|---|---|---|---|
| 2,849,027 | 8/1958 | Tetyak | 211/59.4 X |
| 3,091,348 | 5/1963 | Neuhauser | 211/59.4 X |
| 4,099,626 | 7/1978 | Magnussen, Jr. | 248/68.1 X |
| 4,202,520 | 5/1980 | Loos et al. | 248/68.1 |
| 4,378,923 | 4/1983 | Takei | 206/443 X |
| 4,391,377 | 7/1983 | Ziaylek, Jr. | 206/443 X |
| 4,506,796 | 3/1985 | Thompson | 211/59.4 |
| 4,601,447 | 7/1986 | McFarland | 248/68.1 X |
| 4,610,362 | 9/1986 | Remp et al. | 211/60.1 X |
| 4,618,114 | 10/1986 | McFarland | 248/68.1 X |
| 4,706,822 | 11/1987 | Remp, Jr. et al. | 211/59.4 |
| 4,901,870 | 2/1990 | Wright et al. | 211/59.4 |
| 4,919,372 | 4/1990 | Twist et al. | 248/68.1 X |
| 5,080,314 | 1/1992 | Moyer et al. | 211/59.4 X |
| 5,123,547 | 6/1992 | Koch | 211/59.4 |
| 5,161,703 | 11/1992 | Patton | 211/59.4 |
| 5,429,268 | 7/1995 | Hale et al. | 206/443 X |
| 5,433,322 | 7/1995 | Williams | 211/59.4 X |
| 5,564,576 | 10/1996 | Masuda | 211/60.1 |

FOREIGN PATENT DOCUMENTS

| | | |
|---|---|---|
| 53-068481 | 6/1978 | Japan. |
| 2-025466 | 2/1990 | Japan. |
| 91/02688 | 3/1991 | WIPO. |

*Primary Examiner*—Korie Chan
*Assistant Examiner*—Sandra Snapp
*Attorney, Agent, or Firm*—Oliff & Berridge

[57] ABSTRACT

A fixture assembly for accommodating variance in size and number of pipe materials lying in a horizontal plane is provided. The fixture assembly includes plural pairs of fixture bodies 15A and 15B defining a pair of inclined portions 11A and 11B and a horizontal support surface 12A. A spacer member 25 is disposed between the pair of fixture bodies. The spacer member including a support surface 12B for the pipe material, the support surface 12B being coplanar with the horizontal support surface 12A. The plurality of pairs of fixture bodies with the spacer member therebetween are clamped, together with a bar member disposed between adjacent pairs of fixture bodies, between clamp frames 17A and 17B in an aligned manner. The fixture bodies and the spacer members may be formed from recycled plastic material.

1 Claim, 7 Drawing Sheets

FIXTURE ASSEMBLY FOR PIPE MATERIALS

FIELD OF THE INVENTION

This invention relates to a fixture assembly for use in storing and/or transporting pipe materials. More particularly, the invention relates to a fixture assembly including a plurality of rows of fixture for maintaining a style of stacked, plural stages of pipe materials lying in a horizontal plane in an aligned manner, the rows including an upper row disposed on the upper-most stage of pipe materials, at least one intermediate row disposed between the adjacent stages of pipe materials, and a lower row disposed below the lower-most stage of pipe materials.

BACKGROUND ART

A various kinds of fixtures are proposed for storing and/or transporting pipe materials in an aligned manner. For example, Japanese Patent Publication No. 3-505077 discloses a fixture for pipe materials. This fixture 7 includes, as shown in FIG. 7, an elongate moldings 3 on which pipe materials 1 are to be mounted. Each molding includes recesses 2 of a semicircular cross-section spaced apart a predetermined distance in its upper and lower surfaces. The fixture may includes a plurality of formed blocks 4 having the above recesses 2. The molding or formed block includes a hollow inside. An elongate web member 5 is threaded through the hollow inside. An assembly consisting of a plurality of stacked rows of such moldings 3 or blocks 4 and the web members 5 are tightly combined together by means of set bolts 6 extending vertically through the opposite ends of the web members 5, so as to form the fixture.

By using such fixture 7, a plurality of pipe materials 1 may be held in an aligned manner for storage or transportation. Thus, the pipe materials 1 may be prevented from being damaged since frictional movement therebetween and slippage thereof are restricted.

SUMMARY OF THE INVENTION

With the fixture 7 shown in FIG. 7, it is impossible to alter the radius of curvature of the recesses 2 defined in the upper and lower surface thereof of the modling 3 or formed block 4. The distance between the adjacent recesses 2 is also kept constant. When the radius of curvature of the outer periphery of the pipe material 1 is not correctly consistent with the radius of curvature of the recess 2, the pipe material 1 cannot be stably received within the recess 2, so that scratches on the pipe materials and slippage of the pipe material may be undesirebly caused.

The object of the invention is to provide a fixture assembly capable of accommodating variance in size and number of pipe materials lying in a horizontal plane.

In order to achieve the above object, a fixture assembly for maintaining a style of stacked stages of pipe materials lying in a horizontal plane and arranged in parallel relative to one another comprising an upper row of fixture bodies disposed on the upper-most stage of pipe materials, at least one intermediate row of fixture bodies disposed between the adjacent stages of pipe materials, a lower row of fixture bodies disposed below the lower-most stage of pipe materials, each of the fixture bodies being horizontally separable into two pieces at a separation plane and including a support surface having a pair of inclined portions disposed at horizontally opposite ends of the support surface, the pair of inclined portions being adapted to be engaged with the outer circumference of a respective pipe material, an engagement portion at each of the opposite sides of the fixture body adjacent to the support surface, the engagement portions being in a form of protrusion or groove extending in the horizontal direction which is perpendicular to the axial direction of the pipe material, and a spacer member insertable between the pair of inclined portions at the separation plane, a plate member disposed between the adjacent fixture bumber of fixture bodies in each row may be easily changed. Thus, the number of pipe materials lying in a horizontal plane may be easily changed.

BEST MODE FOR CARRYING OUT THE INVENTION

Several embodiments of the invention will be explained below with reference to FIGS. 1 through 6.

Figure 1A:
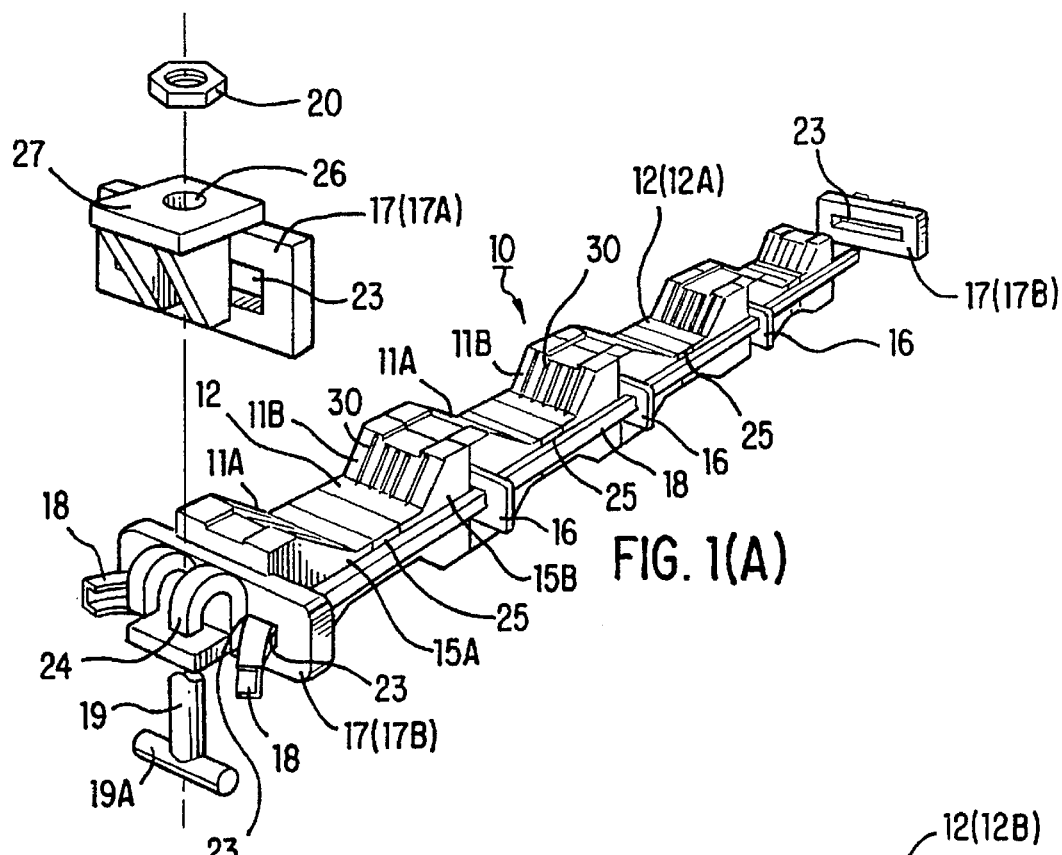
FIG. 1(A) is an exploded perspective view of the entire construction of a fixture according to the invention.
Figure 1B:
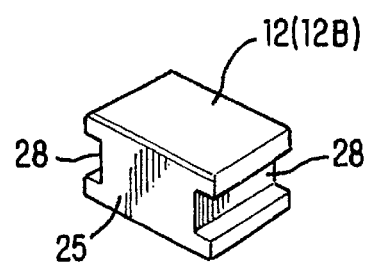
FIG. 1(B) is a perspective view of a spacer member.
Figure 1C:
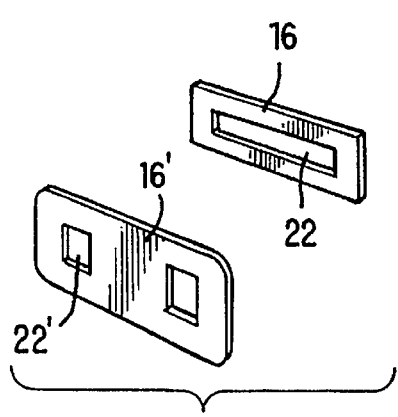
FIG. 1(C) is a perspective view of two plate members and FIGS. 1(D) and 1(E) are cross-sectional views each illustrating an engagement portion on the fixture body and a bar member to be engaged therewith.
Figure 1D:
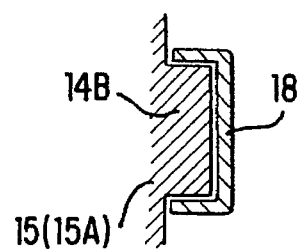
Figure 1E:
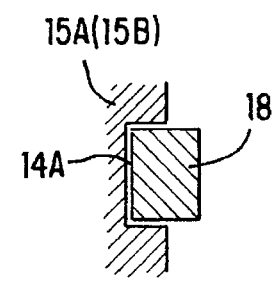
Figure 2A:
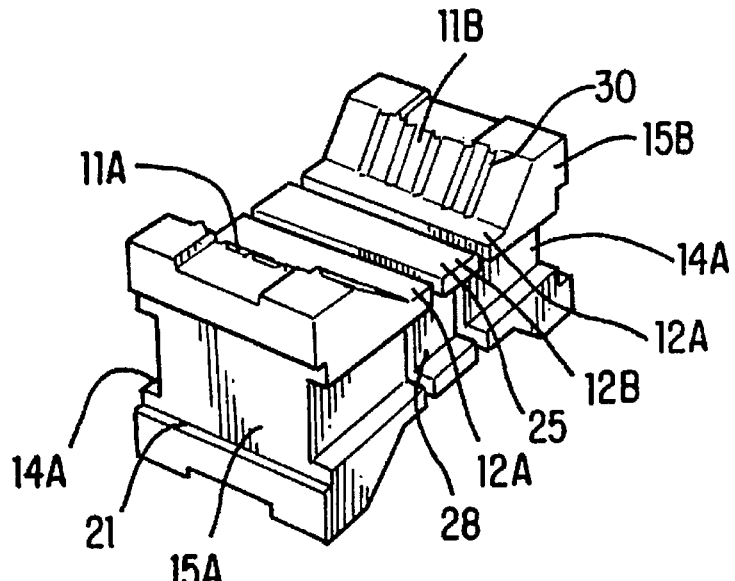
FIG. 2(A) is a perspective view of fixture bodies and a spacer member according to a first embodiment of the invention.
Figure 2B:
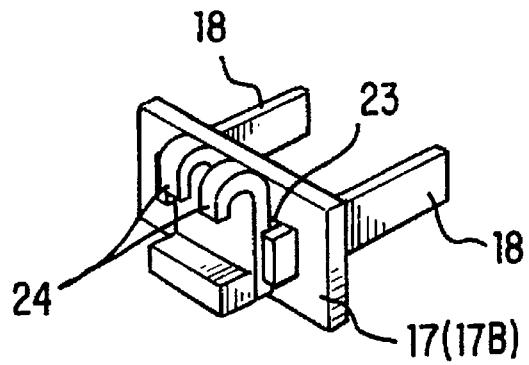
FIG. 2(B) is a perspective view showing connection between the bar member and a clamp frame.
Figure 2C:
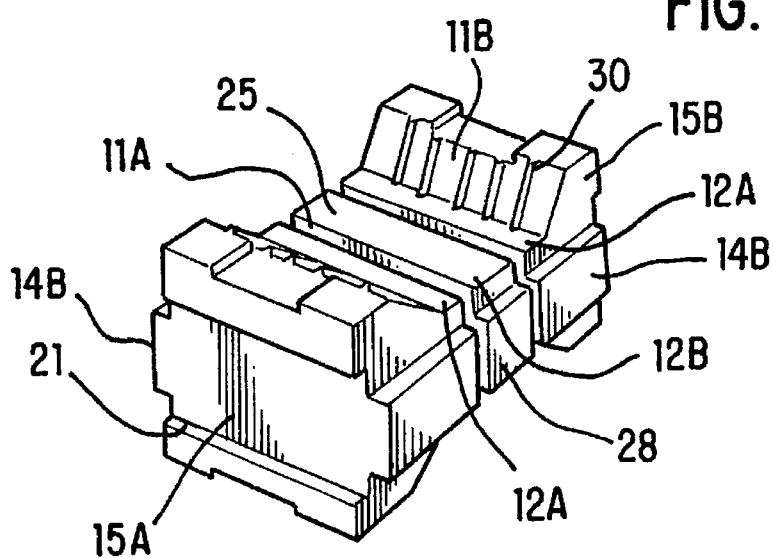
FIG. 2(C) is a perspective view of fixture bodies and a spacer member according to a second embodiment of the invention.

According to a first embodiment of the invention, a fixture 10 for securing pipe materials 1 thereon is formed by the combination of a plural pairs of fixture bodies 15A and 15B, plate members 16, clamp frames 17, bar members 18, and plural pairs of set bolt 19 and nut 20, as shown in FIGS. 1 and 2. A spacer member 25 disposed between the pair of the fixture bodies 15A and 15B may be optionally used. Although such spacer members are shown in FIGS. 1 and 2, the first embodiment will be explained as it does not include the spacer members.

Specifically, an upper surface and a lower surface are formed between the pair of fixture bodies 15A and 15B. Each of the upper surface and the lower surface defines a support surface 12 for abutment with a respective pipe material 1. Each support surface 12 includes oppositely disposed inclined portions 11A and 11B for clamping a respective pipe material 1 therebetween. As shown in FIG. 1(D) or FIG. 1(E), an engagement portion 14 is formed in the opposed front and rear end surfaces of each of the pair of fixture bodies 15A and 15B, the front and rear end surfaces lying in a respective plane perpendicular to the plane of the support surface 12. The engagement portion 14 extends horizontally in a direction perpendicular to the axial direction of the pipe member 1, so as to be engaged with a respective positioning bar member 18 which will be explained later. The engagement portion 14 may take a form of protrusion 14B shown in FIG. 1(D), or a form of groove 14A shown in FIG. 1(E).

The pair of fixture bodies 15A and 15B may be separated from one another in the longitudinal direction (perpendicular to the axis of a pipe material) at a mid-point of the support surface 12A extending in the horizontal direction from the lower ends of the inclined portions 11A and 11B. This allows insertion of a spacer member 25 (to be explained later) into a space between the fixture bodies 15A and 15B.

A plate member 16 (or 16') shown in FIG. 1(C) as an auxiliary positioning member is disposed between the fixtures 10 consisting of plural pairs of oppositely disposed fixture bodies 15A and 15B. Each of the plate members 16 includes an opening 22 (or a pair of openings 22') for permitting insertion of a bar member 18 (to be explained later) therethrough. Each of the longitudinal end surfaces of the fixture 10 is formed with a recess 21 extending in the transverse direction (a direction in parallel with the axial direction of the pipe member), as shown in FIG. 2(A). The plate member 16 is fitted into the recess 21.

Thus, the plate members 16 and the plural pairs of fixture bodies 15A and 15B, which are alternately disposed in an aligned fashion, constitute the fixture. A pair of left and right clamp frames 17 are oppositely disposed at the respective longitudinal ends of the fixture 10. Each of the clamp members 17 is disposed in a respective recess 21 in the longitudinally outer-most or inner-most fixture body in surface to surface contact therewith.

The clamp frame 17 includes an opening 23 for permitting insertion of the bar member 18 therethrough. The clamp frame 17 is provided, at the outer surface thereof, with a pair of left and right hooks 24 of a substantially inverted U-shaped configuration. The pair of hooks are adapted to be engaged with the lower end portion and the intermediate shaft portion of a set bolt 19 (to be explained later). The pair of hooks is provided in the clamp frame 17B other than the clamp frame in the upper-most stage. The clamp frame 17A in the upper-most stage is provided, at the outer surface thereof, with a guide plate 27 attached thereto. The guide plate 27 includes a hole 26 for permitting insertion of the set bolt 19 therethrough.

The bar members 18 cooperate to serve as a position limiting means for securely positioning, between the pair of clamp frames 17A and 17B, the pairs of fixture bodies 15A and 15B (the number of the pairs corresponding to the number of the pipe materials 1 to be arranged on the fixture in the transverse direction), and the plate members 16 disposed between the adjacent pairs of fixture bodies. Each of the bar members 18 is formed from a long shape steel or bar steel. The bar members 18 may be cut into a suitable length depending upon the number of the pipe materials 1 to be arranged in the transverse direction.

The bar members 18 are configured in their cross-sectional shape so that they may be suitably fit over or fit in the engagement portions 14 in the front and rear end surfaces of the fixture bodies 15A and 15B, the openings 23 of the clamp arms 17, 17A or 17B, and the openings 22 or 22' of the plate members 16. Specifically, the bar member 18 may be shaped into a substantially C-shaped configuration when the engagement portion 14B is in a form of a protrusion as shown in FIG. 1(D), so that the bar member 18 may cover the protrusion. On the other hand, the bar member 18 may be shaped into a rod having a rectangular cross-section when the engagement portion 14A is in a form of a groove as shown in FIG. 1(E), so that the bar member 18 may be fitted in the groove. The bar member 18 is threaded through the openings 22 and 23 of the fixture bodies 15A and 15B and the clamp frames 17A and 17B, respectively. The opposite ends of the bar member 18 positioned outwardly of the respective clamp frames 17A and 17B are bent into a curved configuration, for example, by means of a pliers, so that the fixture bodies 15A and 15B, plate members 16 and the clamp frames 17A and 17B may be unitarily assembled. Although the opposite ends of the bar member 18 may be most conveniently bent into a curve configuration as mentioned above when the fixture bodies 15A and 15B are assembled at a site where the pipe materials 1 are loaded, the opposite ends of the bar member 18 may be joined, for example by means of welding, to the clamp frames 17A and 17B when the fixture bodies 15A and 15B are assembled at a work shop.

A single pipe material 1 is mounted on the support surface 12 of each of the pairs of fixture bodies 15A and 15B which are held in an aligned manner by the plate members 16, the bar members 18 and the clamp frames 17 (17A or 17B). Then, another pairs of fixture bodies 15A and 15B are superposed on the pipe materials 1. By this, each pipe material 1 is clamped between the opposite support surfaces 12 of the lower pair of fixture bodies 15A and 15B and the upper pair of fixture bodies 15A and 15B.

The above superposing operation will be repeated predetermined times. Then, the rod 19A at the lower end of the set bolt 19 is engaged with the hooks 24 of the clamp frame 17B in the lower-most stage. The intermediate shaft portion of the set bolt 19 is inserted between the hooks 24 and 24 of the clamp frames 17 in the intermediate stages. The upper end of the set bolt 19 is inserted in the hole 26 of the guide plate 27 attached to the clamp frame 17A in the upper-most stage. Then, the nut 20 is tightly threaded on the upper end of the set bolt 19, so as to cause the fixture bodies 15A and 15B to be tightly clamped in the vertical direction.

Although, in the embodiment shown in FIG. 1(A), a T-shaped bolt having the rod 19A for engagement with the hooks 24 at its lower end is used as the set bolt 19, any tightening means other than the T-shaped bolt may be used, provided that it may be assemble together with the hooks 24 and the guide plate 27. It is noted that a clamp frame 17B of an inverted configuration may be used in place of the clamp frame 17A in the upper-most stage, so that the hooks 24 in the upper-most and lower-most stages may be tightened together by means of a length of wire or cable.

According to a second embodiment of the invention, a spacer member 25 is disposed between the pair of fixture bodies 15A and 15B, so that the pair of fixture bodies are separated from one another along a line extending in the axial direction of the pipe material 1, as shown in FIGS. 1 through 5. The spacer body 25 includes a support surface 12B which is substantially coplanar with the horizontal portion 12A of the support surface 12 of the fixture bodies 15A and 15B. The spacer member 25 also includes opposite engagement portions 28 for the bar members 18 disposed at positions corresponding to respective engagement portions 14A and 14B of the fixture bodies 15A and 15B.

The distance between the pair of fixture bodies 15A and 15B in the longitudinal direction thereof may be changed by using spacer members 25 of various width W. It is therefore possible to apply a predetermined tightening pressure on the pipe material 1 clamped between the upper and lower pairs of fixture bodies 15A and 15B, so as to obtain a stable, clamped condition of the pipe material, when different pipe materials of various radial dimensions R1, R2, R3 . . . are used. It is noted that the usage and construction of the fixture 10 for the pipe materials 1 according to the second embodiment are similar to those of the fixture according to the first embodiment, except the fact that the spacer member 25 is disposed between the pair of fixture bodies 15A and 15B, the spacer member serving as a dimensional adjustment means for accommodating variance in diameter of the pipe materials 1.

In order to increase the ability of the fixture in positioning and securing the pipe materials 1, it is of course preferable to support the pipe material 1 in its outer peripheral surface by means of a three-point support method, utilizing the inclined portions 11A and 11B of the fixture bodies 15A and 15B, and the horizontal support surface 12A defined by the bottom ends of the fixture bodies 15A and 15B, as well as the support surface 12B defined in the upper surface of the spacer member 25. To this end, it is also possible, in an alternative embodiment, to adjustably change the angle of inclination of and the distance between the inclined portions 11A and 11B, when the diameter of the pipe material 1 is changed. In any embodiment, the fixture bodies 15A and 15B and the spacer members 25 may be formed from recycled plastic material, so as to provide a fixture 10 capable of accommodating variation in diameter of the pipe materials 1 at a relatively low cost. It is also noted that the fixture bodies 15A and 15B and the spacer members 25, after use, may be completely separated from the remaining iron or steel materials, such as bar members 18. Thus, such separated material, after being melted or crushed, may be recycled as raw material for similar pipe fixtures or another plastic articles.

Figure 3A:
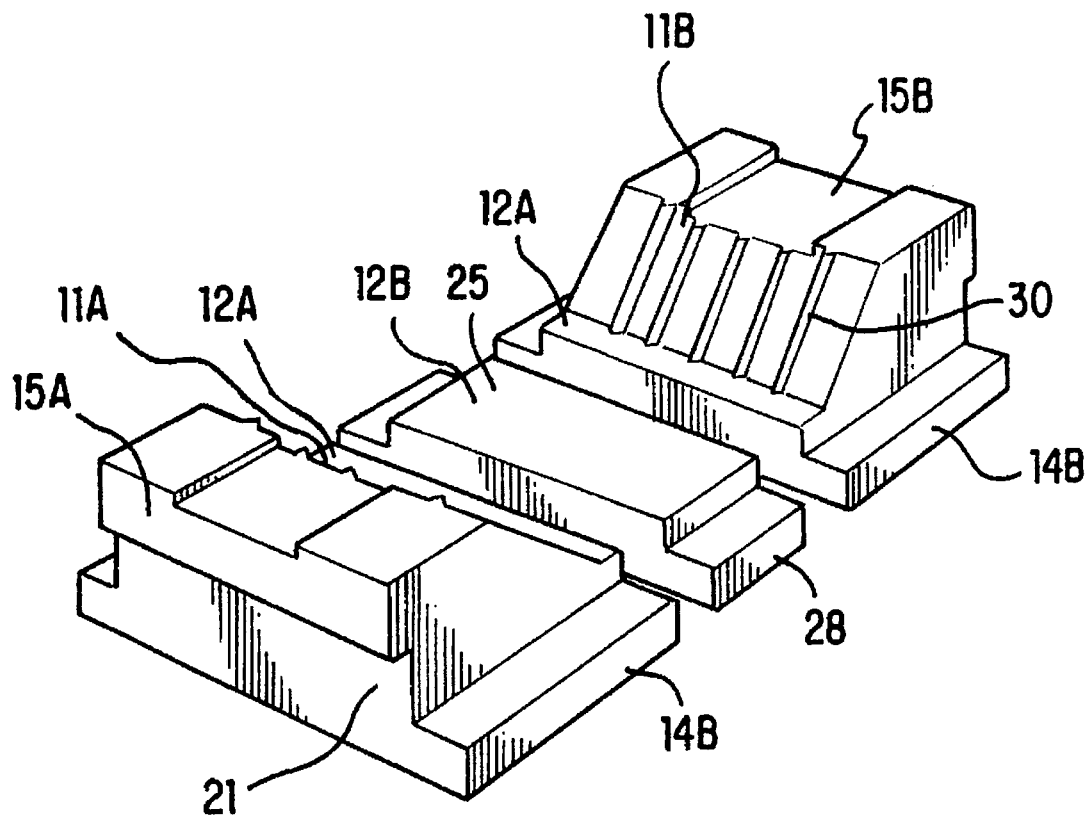
FIG. 3(A) is a perspective view of fixture bodies according to third embodiment of the invention.
Figure 3B:
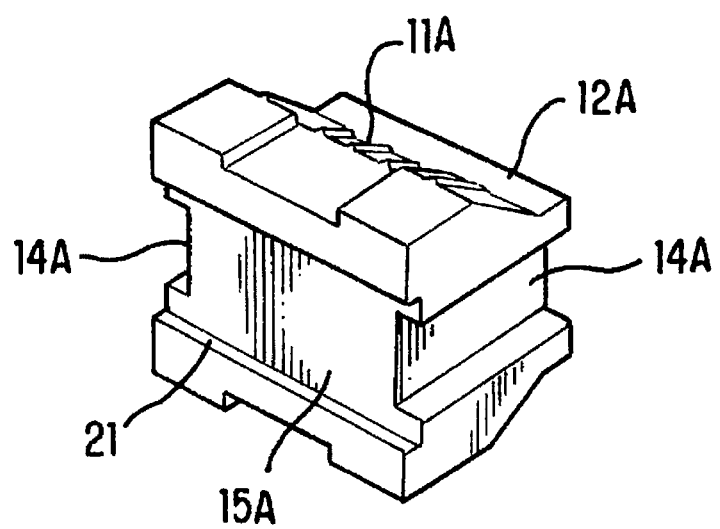
FIG. 3(B) is a perspective view similar to FIG. 2(A) showing the fixture body of the first embodiment of the invention.
Figure 4A:
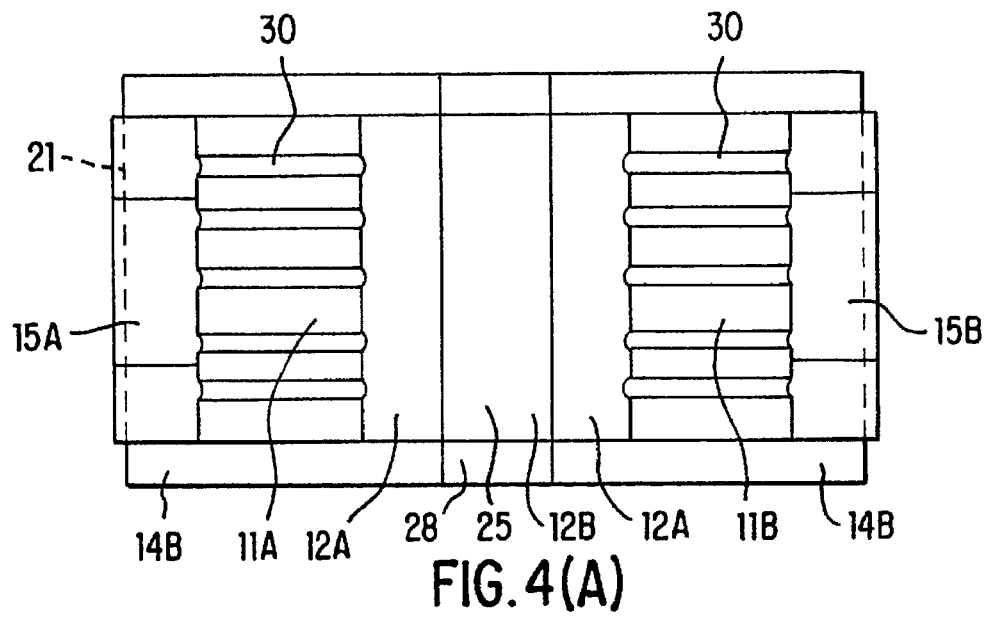
FIG. 4(A) is a plan view showing a combination of the fixture bodies and spacer member.
Figure 4B:
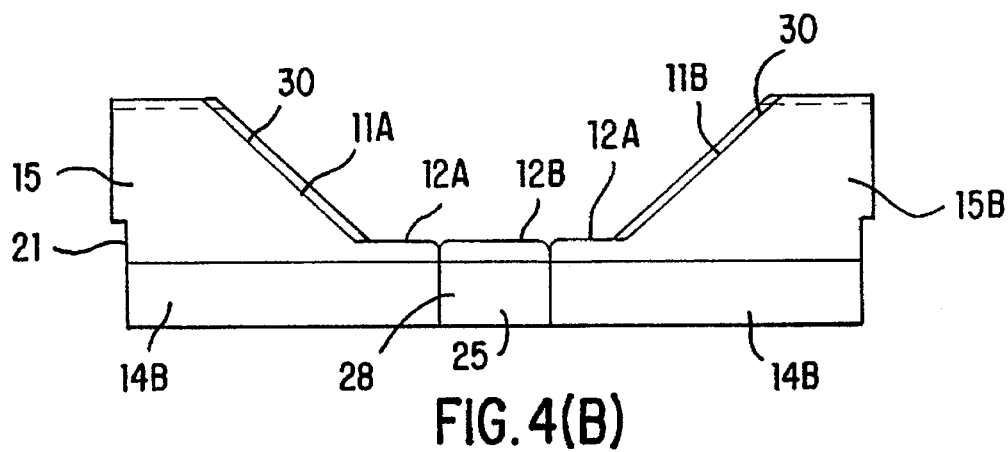
FIG. 4(B) is a front elevational view showing a combination of the fixture bodies and the spacer member.
Figure 4C:
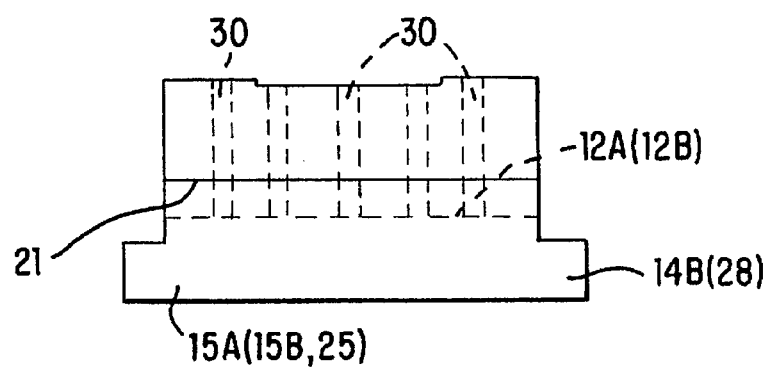
FIG. 4(C) is a side elevational view of the fixture body.
Figure 5A:
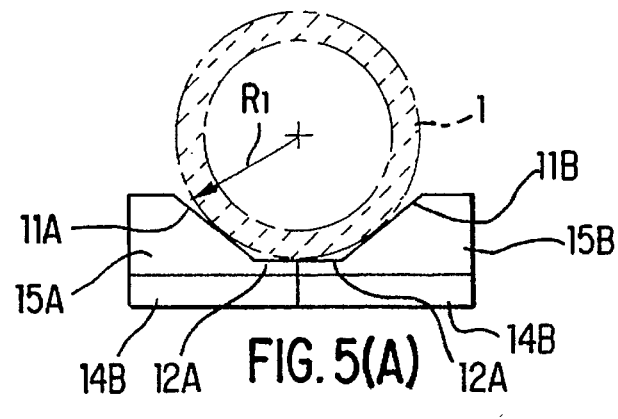
FIGS. 5(A) through 5(C) are front elevational views of various spacer members having different widths corresponding to pipe materials of different sizes and the fixture bodies clamping a respective spacer member therebetween.
Figure 5B:
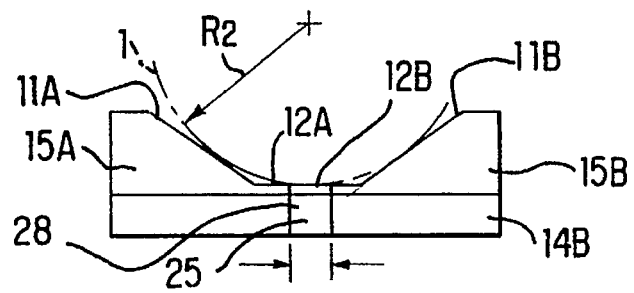
Figure 5C:
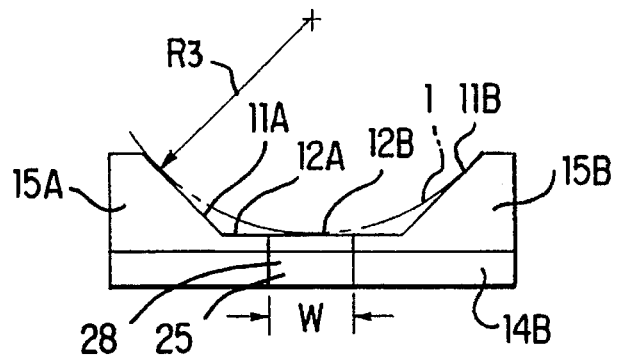
Figure 5D:
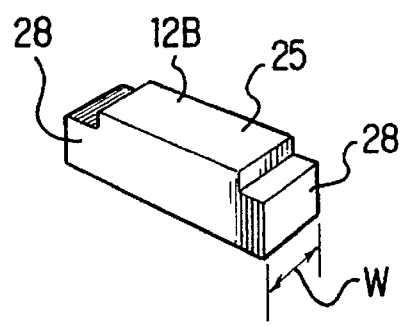
FIG. 5(D) is a perspective view of the spacer member.
Figure 6:
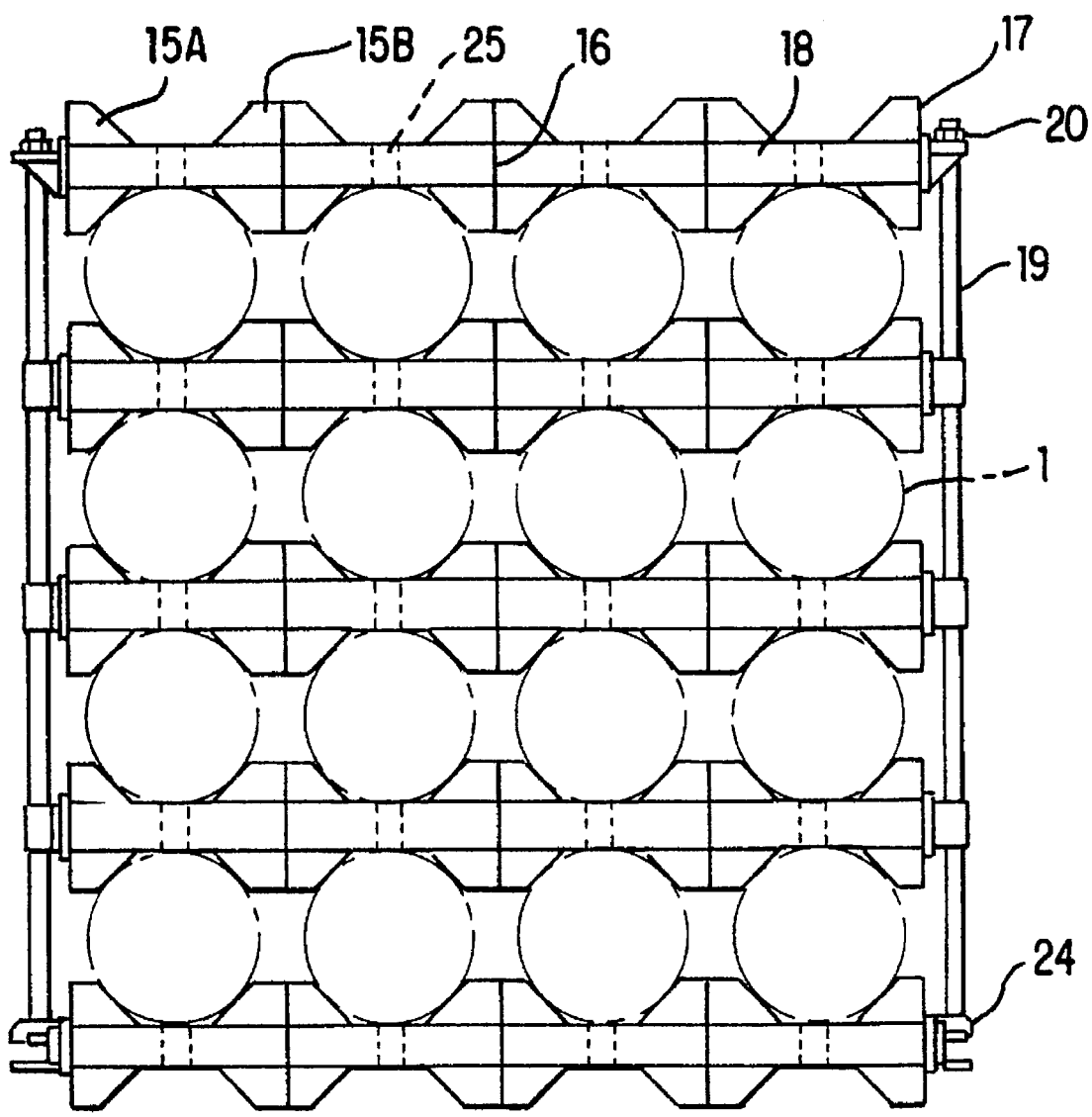
FIG. 6 is a front elevational view of a fixture assembly including stacked, plural rows of fixture bodies.
Figure 7:
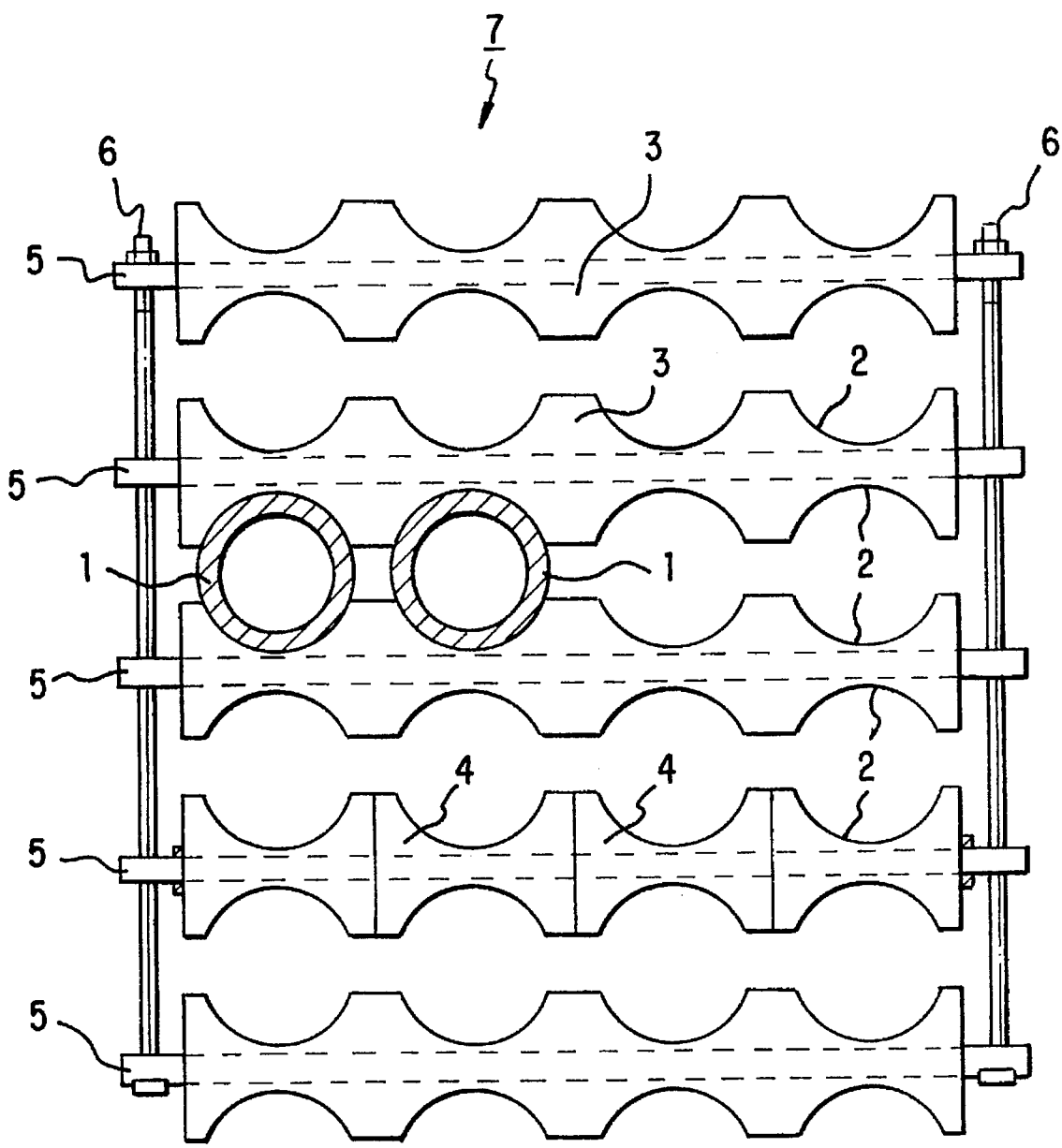
FIG. 7 is a front elevational view showing a fixture assembly for pipe materials in prior art.

FIG. 3(A), FIG. 4 and FIG. 5 show a third embodiment of the invention. In this embodiment, a support surface 12A and 12B for pipe materials 1 are formed in either one of the upper surface and lower surface of the fixture bodies 15A and 15B and the spacer member 25. In this regard, it is noted that the engagement portions 14B and 28 are solely limited to the configuration of protrusion. The construction of the remaining portions and usage of the fixture 10 according to the third embodiment are similar to those of the first and second embodiments shown in FIGS. 1 and 2.

Two sets of the fixture bodies 15A and 15B and the spacer member 25 defining support surfaces 12A and 12B, respectively, in one of the upper and lower surfaces thereof may be stacked and combined so as to form integral fixture bodies 15A and 15B and an integral spacer member 25. In this case, the engagement portions 14B and 14B and 28 and 28, respectively adjacently disposed in the vertical direction, are received in the substantially C-shaped groove of the bar member 18. This construction contributes to reduce the minimum unit of the fixture bodies 15A and 15B and the spacer member 25, whereby they may be conveniently recycled and reclaimed. It is also noted that the single sided fixture bodies 15A and 15B and the spacer member 25 shown in FIGS. 3(A), 4 and 5 may be used in the upper-most and/or lower-most stage of the fixture assembly. This causes the lower-most stage of the fixture assembly to be flattened, so as to increase stability of the fixture assembly, while obviating unnecessary projections or protrusions in the upper-most stage of the fixture assembly.

It is noted that, in the above first to third embodiments, reference numeral 30 designates a plurality of protrusions provided in the support surfaces 11A and 11B of the fixture bodies 15A and 15B for the pipe material 1 in order to prevent shift or movement of the pipe material.

What is claimed is:

1. A fixture assembly for maintaining a style of stacked stages of pipe materials lying in a horizontal plane and arranged in parallel relative to one another, said fixture assembly comprising:

an upper row of fixture bodies adapted to be disposed on the upper-most stage of pipe materials;

at least one intermediate row of fixture bodies adapted to be disposed between the adjacent stages of pipe materials;

a lower row of fixture bodies adapted to be disposed below the lower-most stage of pipe materials;

each of the fixture bodies being horizontally separable into two pieces at a separation plane and including a support surface having a pair of inclined portions disposed at horizontally opposite ends of said support surface, said pair of inclined portions being adapted to be engaged with the outer circumference of a respective pipe material, an engagement portion at each of the opposite sides of said fixture body adjacent to said support surface, said engagement portions being in a form of protrusion or groove extending in the horizontal direction which is perpendicular to the axial direction of the pipe material, and a spacer member insertable between the pair of inclined portions at the separation plane;

a plate member disposed between the adjacent fixture bodies in each of the rows of fixture bodies and having an opening adjacent to said engagement portion;

clamp frames each disposed at the horizontally opposite ends of each of said rows of fixture bodies and having an opening adjacent to said engagement portion of the corresponding fixture body;

a pair of bar members in each of said rows of fixture bodies, each of said bar members extending through said openings of said plate members and said clamp frames and being engaged with the corresponding engagement portions of said fixture bodies, the opposite ends of each of said bar members being secured to the corresponding clamp frame; and means for tightening together, in the vertical direction, the corresponding clamp frames in said upper and lower rows of fixture bodies.

* * * * *